Dec. 12, 1933. J. BACKSTATTER ET AL 1,939,094
OIL LEVEL INDICATOR
Original Filed Dec. 17, 1928 2 Sheets-Sheet 1
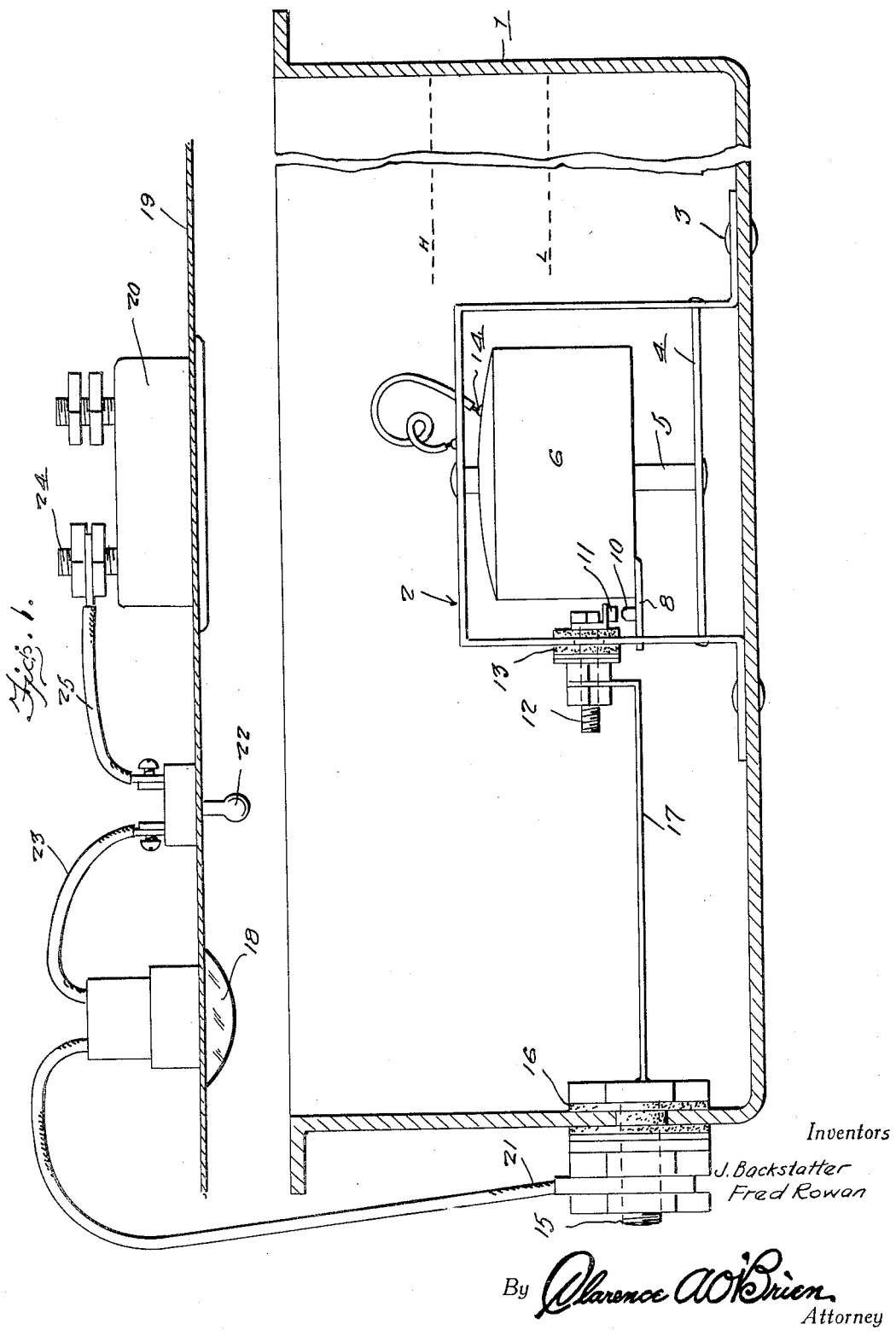
Inventors
J. Backstatter
Fred Rowan
By Clarence A. O'Brien
Attorney

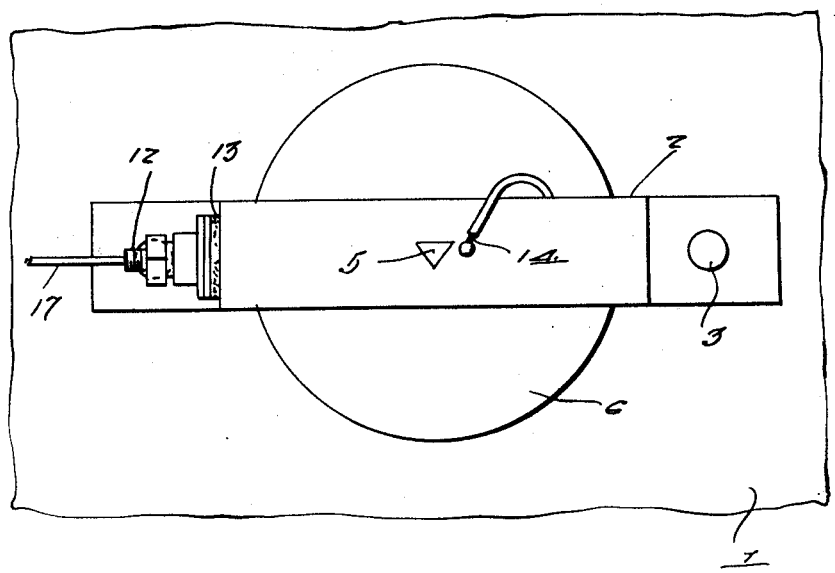
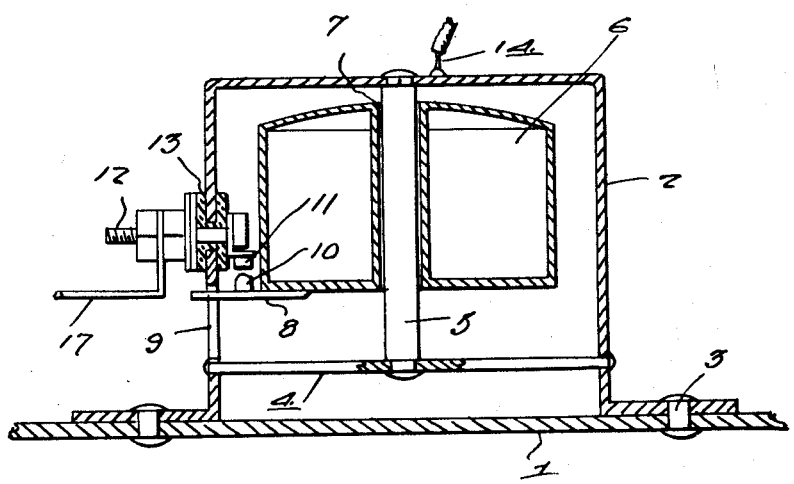

Patented Dec. 12, 1933

1,939,094

UNITED STATES PATENT OFFICE 1,939,094

OIL LEVEL INDICATOR

Joseph Backstatter and Fred Rowan, Winfield, Long Island, N. Y.

Refiled for abandoned application Serial No. 326,593, December 17, 1928. This application April 19, 1932. Serial No. 606,265

1 Claim. (Cl. 200—84)

This application is filed in the place and stead of original application filed December 17, 1928, Serial No. 326,593.

The present invention relates to improvements in electric signals and has reference more particularly to a device for enabling the driver of an automobile to readily ascertain whether or not there is sufficient oil in the crank case of the engine.

One of the important objects of the present invention is to provide a signalling device of the above mentioned character that includes a visual signal such as a light mounted on the instrument board of the vehicle, a float controlled circuit maker being associated with the signalling lamp for normally closing the circuit to the lamp when there is sufficient oil in the crank case, there being also arranged in the circuit a manually operable switch that normally cuts off the illumination of the lamp but which when thrown on will cause the lamp to light providing of course that there is sufficient oil in the crank case.

When the oil reaches a predetermined level, the float effects the breaking of the circuit so that when the manually actuated switch is turned on, the light on the instrument board will fail to function, thus indicating to the operator that the crank case or oil reservoir must be replenished.

A further object is to provide a signalling device of the above mentioned character that can be readily and easily installed without necessitating any material alterations, said device being at all times positive and efficient in its operation, simple in construction, inexpensive, strong and durable and further well adapted to the purpose for which it is designed.

Other objects and advantages of the invention will become apparent during the course of the following description when taken in connection with the accompanying drawings.

In the accompanying drawings wherein like reference characters indicate corresponding parts throughout the same:

Figure 1 is a composite view showing the mechanism arranged in the crank case, and also the signalling means mounted on the instrument board of the vehicle.

Figure 2 is a top plan view of the inverted U-shaped bracket for disposition within the crank case and within which is operable the float, and Figure 3 is a vertical sectional view through the bracket and the float showing the relationship of the stationary and movable contacts.

In the drawings wherein for the purpose of illustration is shown the preferred embodiment of our invention, the numeral 1 designates the oil reservoir or crank case of an internal combustion engine. A substantially inverted U-shaped bracket 2 constructed of flat metal has the free ends of the arms thereof bent laterally and attached to the bottom of the crank case as at 3.

A cross bar 4 extends between the arms of the inverted U-shaped bracket 2 adjacent the bottom of the crank case or reservoir 1, the ends of the cross bar being secured to the respective arms of the bracket in any suitable manner. A pin 5 extends vertically through the intermediate portion of the cross bar 4 and the crown portion of the U-shaped bracket to provide a guide for the hollow metallic float 6, this float being formed with a central vertical bore 7 to accommodate the pin 5 as clearly suggested in Figure 3.

An arm 8 is attached at its inner end on the bottom of the float 6, the outer end of said arm being operable within a slot 9 formed in the adjacent arm of the bracket 2 and carried by the intermediate portion of this arm 8 is the contact 10 that is adapted to cooperate with the stationary contact 11 secured or carried by the headed end of a binding post 12 that extends horizontally through the bracket above the slot 9 and this binding post is insulated from the arm of the bracket as shown at 13 in Figure 3. A ground wire 14 is connected at one end to the float 6 and at its opposite end to the top of the bracket 2.

Our improved signal further includes the provision of a binding post 15 that extends through one end of the casing or reservoir 1, the same being insulated therefrom as at 16. A rigid wire 17 provides an electrical connection between the binding posts 12 and 15 and this feature is clearly shown in Figure 1.

Also included in the signalling device of the present invention is an electric lamp denoted generally by the numeral 18 that is arranged on the instrument board 19. The ammeter that is arranged on the instrument board in the conventional manner is shown at 20. A wire 21 affords a connection between the binding post 15 and one of the contacts of the double contact lamp 18.

A manually operable switch 22 is also mounted on the instrument board and is operatively connected with the lamp 18 by the wire 23 and with the positive binding post 24 of the ammeter 20 by means of the wire 25.

When the oil in the crank case is sufficiently high, the float 6 will manifestly be in a raised position so that the contacts 10 and 11 are in engagement with each other and by turning on the switch 22 the lamp 18 will light, thus indicating to the driver that there is sufficient oil in the crank case. The switch is for the purpose of normally preventing the constant burning of the lamp 18 when there is sufficient oil in the crank case.

Should the oil however drop below a predetermined level, the float 6 will move downwardly on the pin 5, and at the same time the movable contact 10 will be moved out of engagement with the stationary contact 11, thus breaking the circuit to the lamp 18 so that should the switch 22 be again turned on, the lamp will not light, thus giving a warning to the operator that the oil level is low in the crank case and that the same must be replenished.

The provision of a signalling device of the above mentioned character will obviate the necessity of the driver having to leave his seat and inspect the usual oil gage associated with the crank case and furthermore the signalling device described above and disclosed in the drawings will at all times be positive and efficient in its operation.

By reason of the terminal or contact 10 being disposed at the bottom of the float 16, it will be noted that the points 10 and 11 may contact in oil. From this it follows that the contacts or terminals 10 and 11 make and break contacts in the oil or liquid, this being advantageous because it obviates pitting of the contacts or terminals and also obviates arcing.

While we have shown the preferred embodiment of our invention it is to be understood that minor changes in the size, shape and arrangement of parts may be resorted to without departing from the spirit of the invention and the scope of the appended claim.

Having thus described the invention, what we claim as new and desire to secure by Letters Patent is:—

In a circuit maker and breaker of the class described, a liquid container, a substantially inverted U-shaped bracket, the free ends of the arms thereof being disposed laterally and secured to the bottom of the container and one of the arms being provided with a longitudinal guide slot, a binding post extending through one of the arms of the bracket adjacent the upper end of the guide slot, a stationary contact carried by the inner end of the binding post, a cross bar extending between the arms of the bracket adjacent the free ends thereof, a vertical pin arranged between the top of the bracket and the cross bar, a float arranged for vertical movement on said pin, and a contact arm attached to the float for engagement with the aforementioned stationary contact, said arm having its free end disposed for longitudinal travel in the guide slot.

JOSEPH BACKSTATTER.
FRED ROWAN.